United States Patent
Tan et al.

(10) Patent No.: US 10,123,140 B2
(45) Date of Patent: Nov. 6, 2018

(54) DYNAMIC CALIBRATION OF AN AUDIO SYSTEM

(71) Applicant: Microsoft Technology Licensing, LLC, Redmond, WA (US)

(72) Inventors: Desney S. Tan, Kirkland, WA (US); Daniel Morris, Bellevue, WA (US); Andrew D. Wilson, Seattle, WA (US); Yong Rui, Beijing (CN); Nikunj Raghuvanshi, Redmond, WA (US); Jeannette M. Wing, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/345,465

(22) Filed: Nov. 7, 2016

(65) Prior Publication Data

US 2017/0055075 A1    Feb. 23, 2017

Related U.S. Application Data

(63) Continuation of application No. 14/158,793, filed on Jan. 18, 2014.

(51) Int. Cl.
| | |
|---|---|
| *H04R 29/00* | (2006.01) |
| *H04R 27/00* | (2006.01) |
| *H04S 7/00* | (2006.01) |
| *H04M 1/725* | (2006.01) |
| *H04R 3/04* | (2006.01) |
| *H04R 5/04* | (2006.01) |
| *H04W 4/02* | (2018.01) |

(52) U.S. Cl.
CPC ........ *H04R 29/00* (2013.01); *H04M 1/72558* (2013.01); *H04R 3/04* (2013.01); *H04R 5/04* (2013.01); *H04R 27/00* (2013.01); *H04S 7/301* (2013.01); *H04W 4/023* (2013.01); *H04R 2227/005* (2013.01)

(58) Field of Classification Search
CPC .... H04R 29/00; H04R 29/001; H04R 29/003; H04R 29/004
USPC ...................................... 381/56, 58, 59, 303
See application file for complete search history.

(56) References Cited

U.S. PATENT DOCUMENTS

| | | | |
|---|---|---|---|
| 4,393,270 A | | 7/1983 | van den Berg |
| 5,481,615 A | * | 1/1996 | Eatwell ................ G10K 11/178 381/71.6 |

(Continued)

OTHER PUBLICATIONS

Peng, et al., "BeepBeep: A High Accuracy Acoustic Ranging System using COTS Mobile Devices", In Proceedings of the 5th International Conference on Embedded Networked Sensor Systems, Nov. 6, 2007, 14 pages.

(Continued)

*Primary Examiner* — Katherine Faley
(74) *Attorney, Agent, or Firm* — Medley, Behrens & Lewis, LLC

(57) ABSTRACT

Technologies pertaining to calibration of filters of an audio system are described herein. A mobile computing device is configured to compute values for respective filters, such as equalizer filters, and transmit the values to a receiver device in the audio system. The receiver device causes audio to be emitted from a speaker based upon the values for the filters.

20 Claims, 7 Drawing Sheets

(56) References Cited

U.S. PATENT DOCUMENTS

| | | | |
|---|---|---|---|
| 6,721,428 | B1 | 4/2004 | Allred et al. |
| 8,311,487 | B2 | 11/2012 | Pattenden |
| 8,325,944 | B1 | 12/2012 | Duwenhorst et al. |
| 8,472,632 | B2 | 6/2013 | Riedel et al. |
| 8,488,799 | B2 | 7/2013 | Goldstein et al. |
| 2002/0101457 | A1* | 8/2002 | Lang ............... G06F 1/163 |
| | | | 715/856 |
| 2003/0031333 | A1 | 2/2003 | Cohen et al. |
| 2003/0215097 | A1 | 11/2003 | Crutchfield, Jr. |
| 2005/0013443 | A1 | 1/2005 | Marumoto et al. |
| 2005/0063554 | A1 | 3/2005 | Devantier et al. |
| 2005/0152557 | A1 | 7/2005 | Sasaki et al. |
| 2006/0088174 | A1 | 4/2006 | DeLeeuw et al. |
| 2007/0116306 | A1* | 5/2007 | Riedel ............... H04S 7/303 |
| | | | 381/303 |
| 2007/0253561 | A1 | 11/2007 | Williams et al. |
| 2008/0064396 | A1 | 3/2008 | Igoe |
| 2008/0240467 | A1* | 10/2008 | Oliver ............... H03H 17/04 |
| | | | 381/103 |
| 2009/0214051 | A1 | 8/2009 | Lockett et al. |
| 2010/0054486 | A1 | 3/2010 | Sollenberger et al. |
| 2011/0116642 | A1 | 5/2011 | Hall et al. |
| 2011/0150249 | A1 | 6/2011 | Klemmensen |
| 2012/0237037 | A1 | 9/2012 | Ninan et al. |
| 2013/0051572 | A1 | 2/2013 | Goh et al. |
| 2013/0066453 | A1 | 3/2013 | Seefeldt |
| 2013/0315405 | A1 | 11/2013 | Kanishima et al. |
| 2013/0324031 | A1 | 12/2013 | Loureiro |
| 2015/0193196 | A1* | 7/2015 | Lin ............... G06F 3/165 |
| | | | 715/716 |
| 2015/0208184 | A1 | 7/2015 | Tan et al. |

OTHER PUBLICATIONS

"Creative Unveils the World's First Self-Calibrating Wireless Speaker System—the Creative D5xm Intelligent Wireless Speakers", Published on: May 21, 2013, Retrieved at <<http://www.marketwatch.com/story/creative-unveils-the-worlds-first-self-calibrating-wireless-speaker-system-the-creative-d5xm-intelligent-wireless-speakers-2013-05-21>>, Retrieval Date: Aug. 27, 2013, 8 Pages.

"Office Action for U.S. Appl. No. 14/158,793", dated Jul. 23, 2015, 14 pages.

"Response to the Office Action for U.S. Appl. No. 14/158,793", Filed Date: Oct. 23, 2015, 14 pages.

"Final Office Action for U.S. Appl. No. 14/158,793", dated Nov. 20, 2015, 13 pages.

"Response to the Office Action for U.S. Appl. No. 14/158,793", Filed Date: Mar. 27, 2016, 14 pages.

"Office Action for U.S. Appl. No. 14/158,793", dated May 13, 2016, 14 pages.

"Response to the Office Action for U.S. Appl. No. 14/158,793", Filed Date: Jun. 24, 2016, 13 pages.

"Notice of Allowance and Fees Due for U.S. Appl. No. 14/158,793", dated Jul. 21, 2016, 5 pages.

"International Search Report and Written Opinion for PCT Patent Application No. PCT/US2015/010945", dated Jul. 8, 2015, 17 pages.

"Response to the International Search Report and Written Opinion for PCT Patent Application No. PCT/US2015/010945", Filed Date: Oct. 14, 2015, 9 pages.

"Written Opinion for PCT Patent Application No. PCT/US2015/010945", dated Dec. 23, 2015, 5 pages.

"International Preliminary Report on Patentability for PCT Patent Application No. PCT/US2015/010945", dated Mar. 22, 2016, 11 pages.

* cited by examiner

DYNAMIC CALIBRATION OF AN AUDIO SYSTEM

RELATED APPLICATION

This application is a continuation of U.S. patent application Ser. No. 14/158,793, filed on Jan. 18, 2014, and entitled "DYNAMIC CALIBRATION OF AN AUDIO SYSTEM", the entirety of which is incorporated herein by reference.

BACKGROUND

A significant amount of effort has been focused on improving user experience with respect to visual displays in the home environment. For example, a significant amount of research and advancement has occurred with respect to visual quality of traditional displays (e.g., such as televisions and computer monitors), and also with respect to opportunistically leveraging other displays that happened to be in the environment (e.g. "stitching" multiple displays together to make a larger display, moving visual content across multiple displays, etc.). Enhancing an audio experience of the user, however, has lagged behind.

Referring to audio systems in general, while the electronics that generate sounds can have a relatively strong effect on soundscapes and the listening experience, room design and environmental acoustics strongly impact perceived audio quality. One technique for enhancing audio quality output by an audio system is to customize the design of a room in which the audio system will be utilized. This frequently occurs in movie theaters, auditoriums, and the like. Other types of rooms, however, such as classrooms, living rooms, etc., are typically not designed to take into consideration acoustic properties.

An exemplary approach used in connection with some audio systems is to attempt to model acoustic properties of a room utilizing a calibration signal and corresponding microphone. Typically, a user will arrange a set of speakers in a room and locate herself in a position where she will typically be listening to audio output by the audio system. The user is additionally provided with a microphone, and the audio system outputs a calibration signal when the user is at the location where she typically will listen to the audio produced by the audio system. The calibration signal typically includes sounds in all frequency bands supported by the audio system. Audio captured by the microphone is subsequently analyzed to compute a frequency response for the audio system (based upon the location of the microphone). An equalizer of the audio system is then updated based upon the computed frequency response, thereby taking into consideration impact of the environment on audio output by the audio system.

There are several deficiencies associated with this approach. First, the calibration is static—that is, if furniture is rearranged in the room that includes the audio system, the equalizer will no longer be properly calibrated. Second, the equalizer is not calibrated for all positions in the room. Thus, if the user positions herself in a position in the room that is different from her position when the equalizer was calibrated, the listener will be provided with sub-optimal audio.

SUMMARY

The following is a brief summary of subject matter that is described in greater detail herein. This summary is not intended to be limiting as to the scope of the claims.

Described herein are various technologies pertaining to calibration of a filter (e.g., an equalizer or dynamic range compressor) of an audio system using ad-hoc sensors, wherein the calibration is optionally performed dynamically and in real-time. Accordingly, the calibration can be performed as a function of current position of a listener in an environment, and can be updated as such position changes. Accordingly, filter parameters (e.g., used for dynamic range adjustment, equalization, etc.) can be updated as the listener moves about in the environment.

In an example, a computing device being employed by the listener (e.g., for purposes other than filter calibration) can be utilized in connection with calibrating the filter as a function of location of the listener. For instance, the listener may carry a mobile telephone, may use a tablet computing device, may have a wearable computing device thereon (e.g., a smart watch, glasses with computing technologies built in), a Bluetooth headset, a laptop computer, or the like, wherein such computing devices comprise microphones. When audio is output by speakers in the audio system, one or more microphones in any of the computing devices that are in the environment can sample such audio, resulting in construction of at least one audio signal (e.g., an electrical signal that is representative of the audio). If there are multiple active microphones in the environment, a priority may be optionally established. For instance, since listeners typically carry their mobile phones in close proximity to their respective bodies, a mobile phone microphone may have highest priority, while a tablet computing device may have a next highest priority, and so on.

Features can be extracted from the audio signal output by the microphone, wherein such features can be indicative of frequencies in the audio sampled by the microphone and respective amplitudes of the frequencies. Audio data that is indicative of frequencies and their respective ideal amplitudes in the audio can then be acquired. For example, applications exist that are configured to identify musical pieces based upon relatively short samples of such pieces. Therefore, an exemplary application can provide the mobile computing device with the audio data, wherein the audio data comprises frequencies and their respective ideal amplitudes corresponding to some range of time of the audio (e.g., three second, ten second, etc. In another example, rather than the audio data being retrieved by the application, the audio data can be provided to the mobile computing device by a receiver device of the audio system.

The mobile computing device, utilizing the features extracted from the audio signal and the received audio data, can compute respective values for filters, the values configured to optimize the listening experience of the listener (e.g., such that the listener, at her position, hears the audio from the speaker with frequencies and respective amplitudes as intended by a producer of the audio). For example, the mobile computing device can be configured to compute the frequency response for the audio system based upon the audio captured by the microphone (representing audio perceived by the listener) and the received audio data (representing the audio as desirably perceived by the listener). Based upon the frequency response, the mobile computing device can compute values for respective equalization filters, wherein the values are configured to flatten and/or smooth the frequency response. The mobile computing device can then transmit the values for the equalization filters to the receiver device of the audio system, which can update the equalization filters (e.g., such that the audio emitted by a speaker is subjected to the updated equalization filters). With respect to frequencies (or frequency bands) not included in the audio (e.g., musical piece), values for filters corresponding to such frequencies can be selected using interpolation, through utilization of a smoothing function, or set at predefined values.

It can be ascertained that as the listener moves about the environment, the filters can be calibrated for the audio that is being played and for the location of the listener. If multiple listeners are in the room at the same time (e.g., two mobile phones are detected in the environment), then the mobile phones can independently compute respective filter values that can be utilized by the receiver device in the audio system to filter audio. When filter values conflict (e.g., due to the mobile phones being in different locations in the room), the receiver device can execute any suitable computing function, such that relatively high quality audio is provided to both locations.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
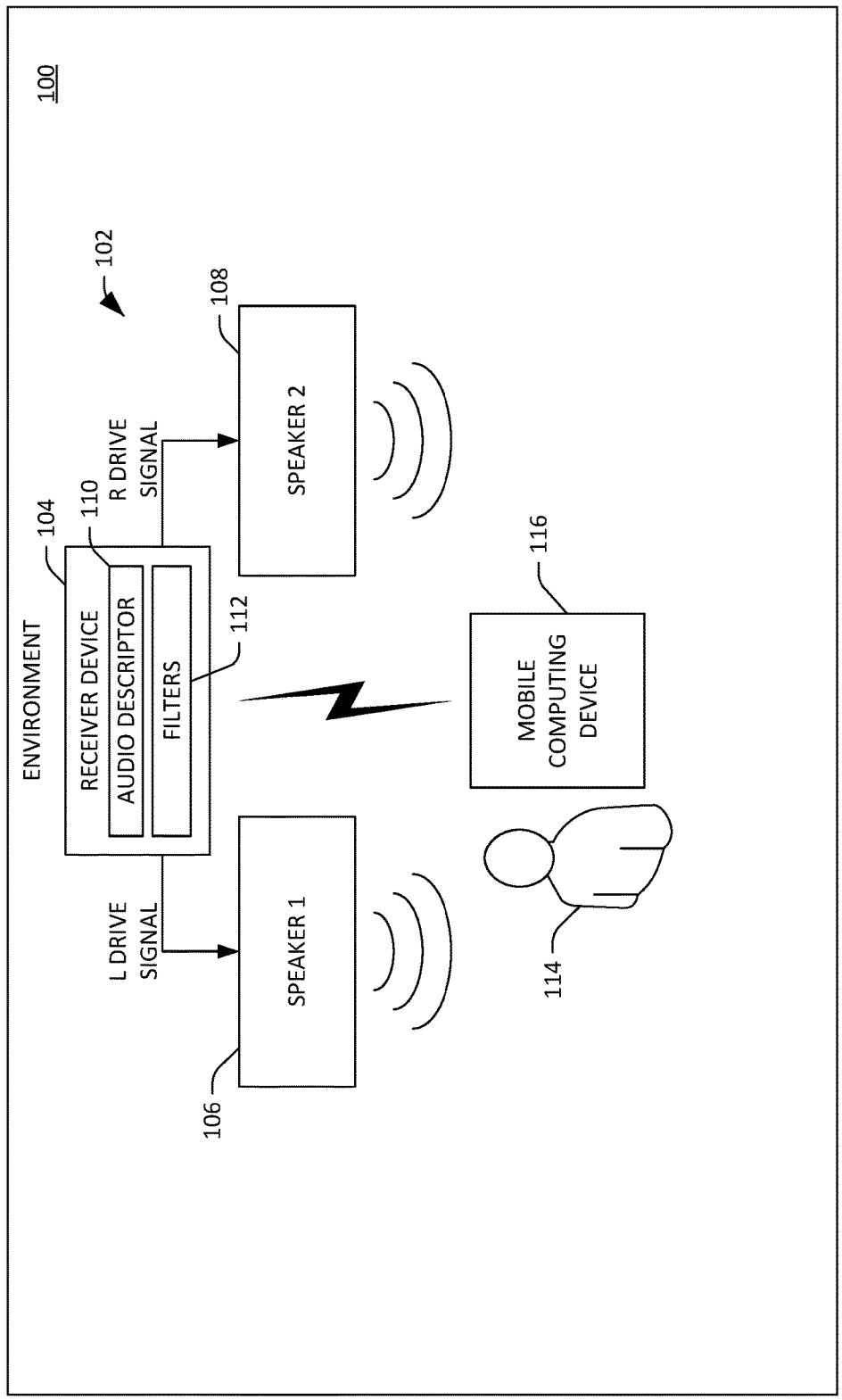
FIG. 1 illustrates an exemplary environment, where filters utilized by an audio system when outputting audio can be calibrated as a function of a location of a listener in the environment.

Various technologies pertaining to calibrating filter parameters in an audio system are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by a single system component may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances; X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

With reference now to FIG. 1, an exemplary environment 100 that includes an audio system 102 is illustrated. The audio system 102 includes a receiver device 104, a first speaker 106, and a second speaker 108. While the audio system 102 is shown as including two speakers 106 and 108, it is to be understood that the audio system 102 may include any suitable number of speakers, including a single speaker, five speakers, seven speakers, or the like. The receiver device 104 is in communication with the first speaker 106 and second speaker 108, such that the receiver device 104 can transmit signals to the speaker devices 106 and 108 that cause the speaker devices to output audio. Such signals are referred to herein as "drive signals." For example, the receiver device 104 can be in communication with the speakers 106 and 108 by respective wired connections, by respective wireless connections (e.g., Bluetooth, Wi-Fi, etc.), or the like. The receiver device 104 can be any suitable apparatus that can process an audio descriptor 110 and generate the drive signals and transmit such drive signals to the speakers 106 and 108, wherein the drive signals cause the speakers 106 and 108 to respectively emit audio represented by the audio descriptor 110. The audio descriptor 110 can be an audio file (e.g., MP3, WAV, . . . ), streaming audio from a web-based service, broadcast audio, dynamically generated audio from a video game, etc. Further, the receiver device 104 can be or include a conventional audio receiver, a computing device (e.g., a game console, a set top box, a laptop computer, a desktop computer, a tablet (slate) computer, a phablet computing device (e.g., a computing device configured for use as a telephone with a display screen diagonal larger than five inches), a mobile telephone, a wearable, etc.), a television, or the like.

The receiver device 104 receives the audio descriptor 110 (e.g., from an audio file, by way of an antenna, from a streaming service, etc.) and causes a left drive signal to be output to the first speaker 106 and a right drive signal to be output to the second speaker 108. When processing the audio descriptor 110, the receiver device 104 can apply filters 112 to drive signals transmitted to the first speaker 106 and the second speaker 108. In an example, the filters 112 can be equalizer filters that can be configured to boost or cut energy of at least one frequency band in audio represented by the audio descriptor 110. In such a case, the filters 112 can have respective values assigned thereto, wherein a value of a filter is indicative of an amount of boosting or cutting (amplification or attenuation) that is applied a particular frequency band. Initially, values for the filters 112 can be set by a manufacturer of the receiver device 104, without taking into consideration acoustics of the environment 100. In another example, the filters 112 can represent a circuit that performs dynamic range compression on audio signals. In such a case, a value of a filter can be indicative of an amount of range compression to perform on the audio represented by the audio descriptor 110 at any given time. In summary, then, the receiver device 104 receives the audio descriptor 110, which can be processed by the receiver device 104 to generate a left drive signal and a right drive signal for the first speaker 106 and the second speaker 108, respectively. The receiver device 104 applies the filters 112 to the left drive signal and the right drive signal, thereby outputting a filtered left drive signal and a filtered right drive signal to the first speaker 106 and the second speaker 108, respectively.

The environment 100 can be a home environment, such as a living room. In other examples, the environment 100 can be a classroom, an auditorium, a lecture hall, an automobile (e.g., a bus), a concert venue, etc. To that end, size of the environment 100, elements in the environment 100 (e.g., doors, windows, furniture, etc.), weather conditions pertaining to the environment 100 (e.g., humidity), etc., can impact a manner in which audio output by the speakers 106 and 108 reflects about the environment 100. For example, due to the arrangement of furniture in the environment 100, the environment 100 may include certain "dead" regions, within which acoustic energy at one or more particular frequencies is attenuated.

The environment 100 includes a listener 114, where quality of audio output by the speakers 106 and 108 that reaches the ears of the listener 114 is a function of the makeup of the environment 100 and the location of the listener 114 therein. A mobile computing device 116, used by the listener 114, may likewise be in the environment 100 and in relative close proximity to the listener 114. For example, the mobile computing device 116 may be a mobile telephone or a tablet (slate) computing device that is typically in relative close proximity to the listener 114. In other examples, the mobile computing device 116 can be a Bluetooth earpiece, a laptop computing device, a wearable (such as glasses or a watch), or other suitable computing device.

The mobile computing device 116 includes a microphone that samples audio emitted from the speakers 106 and 108, and generates an audio signal based upon the sampled audio, wherein the audio signal is an electrical signal that is representative of the audio impacting the microphone. The mobile computing device 116, as will be described in greater detail below, can be configured with functionality for extracting features in the audio signal output by the microphone. For instance, the mobile computing device 116 can be configured to extract data that is indicative of frequencies and amplitudes thereof in the audio at the mobile computing device 116. This can be accomplished, at least partially, by executing a Fast Fourier Transform (or other suitable processing algorithm) over the audio signal.

The mobile computing device 116 can additionally receive data pertaining to the audio descriptor 110 being processed at the receiver device 104. In an example, the audio descriptor 110 may be representative of a musical piece (or a portion thereof), and the mobile computing device 116 can receive audio data that is indicative of frequencies in a particular time window of the musical piece, as well as amplitudes of the frequencies in such time window (e.g., in accordance with the intentions of the producer of the audio). In an example, this audio data can be received from the receiver device 104, as the audio data is included in the audio descriptor 110 or can be extracted when processing the audio descriptor 110. In another example, the mobile computing device 116 can generate the audio signal mentioned above, and a computer-executable application installed on the mobile computing device 116 can identify a musical piece emitted by the speakers 106 and 108 based upon the audio signal. The mobile computing device 116 may then receive the above-mentioned frequency and amplitude data for the musical piece from the computer-executable application.

It can thus be ascertained that the mobile computing device 116 can identify frequencies and amplitudes thereof in the audio captured by the mobile computing device 116, and can further receive frequencies and (ideal) amplitudes thereof that are desirably provided to the listener 114. The mobile computing device 116 can compute a frequency response for the audio system 102 based upon the input signal (the frequencies and respective (ideal) amplitudes thereof desirably provided to the listener 114) and the output signal (the frequencies and respective amplitudes thereof in the audio sampled by the microphone of the mobile computing device 116). The mobile computing device 116 can then compute respective values for the filters 112 based upon the computed frequency response, and transmit such values to the receiver device 104. The receiver device 104 may update respective values of the filters 112 based upon the values received from the mobile computing device 116, and can filter drive signals based upon such values. Accordingly, the filters 112 are calibrated based upon the location of the mobile computing device 116 in the environment 100.

It can be ascertained that the filters 112 are calibrated based upon audio that is already being presented to the listener 114 (e.g., a musical piece the listener desires to hear) rather than the use of a calibration sensor and specialized equipment. In the approach described herein, the microphone of the mobile computing device 116, which the listener 114 already possesses and holds in close proximity, is employed in connection with calibrating the filters 112. Therefore, as the mobile computing device 116 moves about the environment 100, the filters 112 can be calibrated, such that regardless of the position of the listener 114 in the environment 100, the listener 114 is provided with a relatively high-quality experience.

When computing the values for the filters 112, the mobile computing device 116 can utilize a smoothing function, such that a value of a filter does not change instantaneously by a relatively large amount. Furthermore, to reduce computation necessary to compute the values for the filters 112, the mobile computing device 116 may be configured to analyze a subset of frequencies in the sampled audio output by the speakers 106 and 108. For instance, the mobile computing device 116 can be configured to consider only third octave bands. Further, since the audio descriptor 110 is not a calibration signal, the audio signal 110 may not include all frequencies supported by the audio system 102. For frequencies not included in the audio signal 110, the mobile computing device 116 and/or the receiver 104 can automatically set values for respective filters that correspond to such frequencies. Such values can be selected as predefined values, through interpolation (or other smoothing function), etc.

In still yet another exemplary embodiment, the receiver device 104 can retain values for the filters 112 computed by the mobile computing device 116 over time. That is, over time, these values can be indicative of a typical position in the environment 100 of the listener 114 when listening to audio output by the speakers 106 and 108. Therefore, in an example, when the listener 114 does not have the mobile computing device 116 in close proximity thereto, the mobile computing device 116 is shut off, or the mobile computing device 116 is unable to effectively sample audio output by the speakers 106 and 108, the receiver device 104 can be configured to set the filter values based upon averages of respective filter values, median filter values, etc.

In another exemplary embodiment, rather than the mobile computing device 116 being configured to compute respective values for the filters 112, the receiver device 104 can be configured to compute such values. For instance, the microphone of the mobile computing device 116 can sample audio and generate the audio signal as described above. Optionally, the mobile computing device 116 can extract features from the audio signal. The mobile computing device 116 can then transmit the audio signal and/or the extracted features to the receiver device 104 by way of a wireless communications channel, and the receiver device 104 can compute the values for the filters 112. In yet another exemplary embodiment, the mobile computing device 116 may also be the receiver device 104. For instance, the speakers 106 and 108 may be included in a wireless speaker system, wherein the mobile computing device 116 drives the speakers 106 and 108. In such an embodiment, the mobile computing device 116 performs the actions described above as being performed by the receiver device 104.

The mobile computing device 116 and the receiver device 104 can perform the above-mentioned calibration of the filters 112 in a variety of manners. In an exemplary embodiment, the calibration of the filters 112 can be performed dynamically and in real-time, such that the mobile computing device 116 is repeatedly and/or continuously computing the values for the filters 112. In another exemplary embodiment, the mobile computing device 116 can be configured to perform the calibration of the filters 112 periodically, such as once every five seconds. In still yet another exemplary embodiment, the mobile computing device 116 can be configured to perform the calibration of the filters 112 responsive to detection of a particular event, such as a pause in music emitted from the speakers 106 and 108 (e.g., a new musical piece is going to be emitted from the speakers 106 and 108). Further, the mobile computing device 116 can be configured to perform the calibration of the speakers 106 and 108 responsive to detecting that the position of the mobile computing device 116 has changed (e.g., based upon a signal output by an inertial sensor, such as an accelerometer, in the mobile computing device 116, based upon a signal output by a GPS receiver in the mobile computing device, etc.).

From the above, it can be ascertained that the location of the mobile computing device 116 in the environment 100 (e.g., absolute location or location relative to the receiver device 104 and/or the speakers 106 and 108) need not be determined to compute the filter values referenced above. In exemplary embodiments, however, when the location of the computing device 116 (either absolute or relative to a reference location) can be determined, the location of the mobile computing device 116 can be used when setting filter values and/or processing audio to transmit to the listener 114.

In an example, the location of the mobile computing device 116 and/or the listener 114 can be ascertained (e.g., through sensors in the mobile computing device 116, by way of an imaging system in the environment 100, by the receiver device 104, etc.). In an exemplary embodiment, the mobile computing device 116 can receive the location of the mobile computing device 116 and/or the listener 114, and can compute the values for the respective filters based at least in part upon such location. For instance, the mobile computing device 116 can compute values for the respective filters that cause the listener to experience spatialized audio (e.g., the audio output by the speakers 106 and 108 is caused to simulate a particular environment and three-dimensional location of the listener 114 in the environment). Thus, the filter values can be computed to cause audio to be presented to the listener 114 as if the listener were at a particular location in a stadium, cathedral, theater, etc. Further, head pose of the listener 114 can be ascertained, and audio can be output by the speakers 106 and 108 based upon such head pose. The head pose can be ascertained based upon data output by sensors of the mobile computing device 116 (e.g., a camera), based upon a vision sensor in the environment 100, etc. The values for the filters can be computed by the mobile computing device 116 and/or the receiver device 104 to cause spatialized audio to be presented to the listener 114 based upon a head-related transfer function (HRTF) for ears of the listener, and optionally through use of beamforming speakers.

As indicated above, three-dimensional location of the mobile computing device 116 can be determined in any suitable manner. For instance, the mobile computing device 116 can monitor computed frequency responses (computed as described above) over time, and can create a coarse three-dimensional map of the environment 100 based upon the computed frequency responses. Thus, the mobile computing device 116 can analyze a computed frequency response, and can estimate its location in the environment 100 based upon the computed frequency response. Still further, spatial relationships between parts of an indoor environment can be inferred over time based upon audio sampled at the mobile computing device 116. For instance, a coarse map can be generated that indicates that a first room and a second room are nearby the speakers 106 and 108, but that a third room is relatively far away from the speakers 106 and 108. These inferred relationships can be used when outputting audio at the speakers 106 and 108. Therefore, the mobile computing device 116 (or the receiver device 104) can be configured to generate a map of the environment 100 based upon features extracted from an audio signal output by a microphone of the mobile computing device 116.

Figure 2:
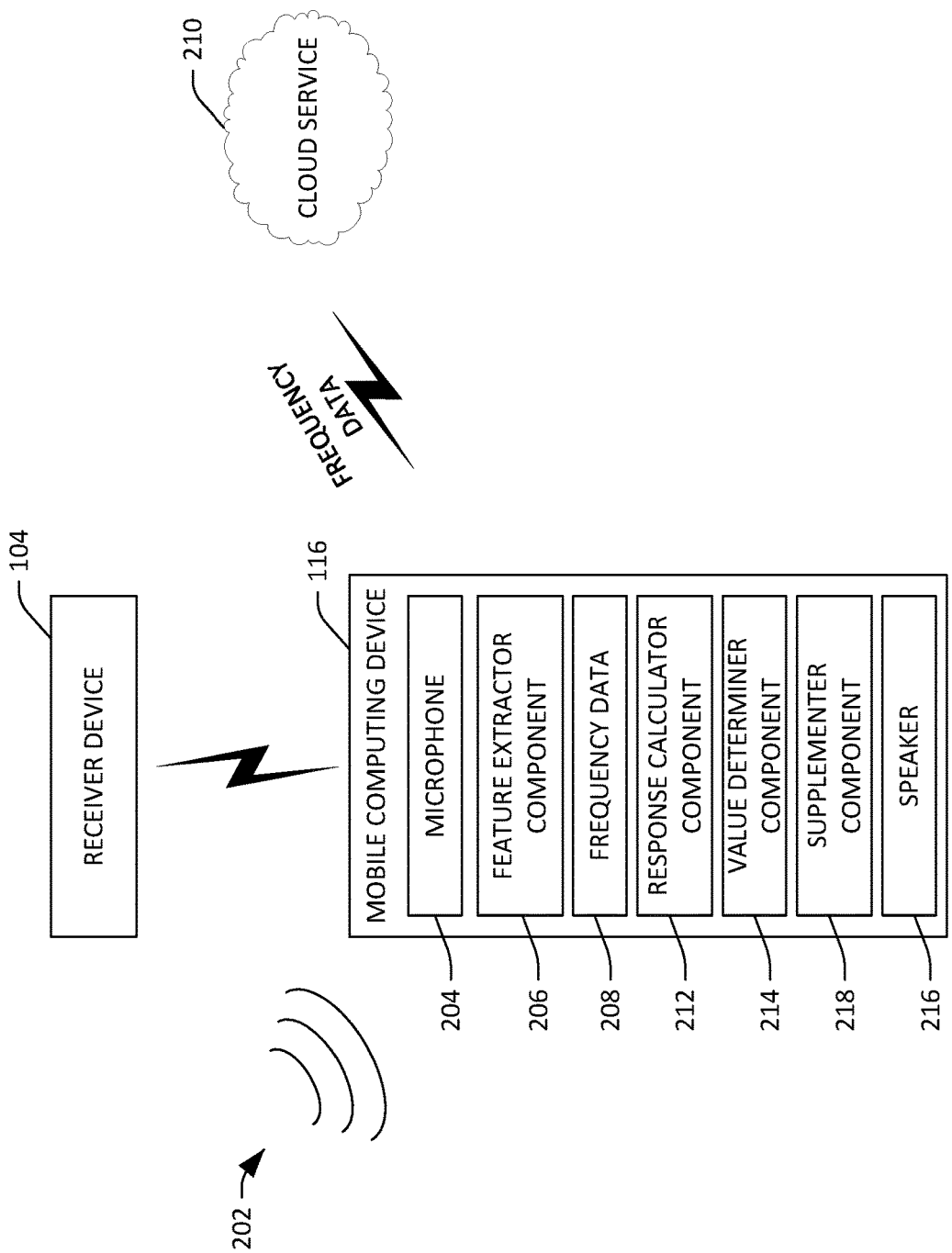
FIG. 2 is a functional block diagram of an exemplary mobile computing device that can compute filter values for use by a receiver device of an audio system.

Referring now to FIG. 2, a functional block diagram of the mobile computing device 116 is illustrated. As discussed above, the receiver device 104 drives the speakers 106 and 108 to output audio 202. The mobile computing device 116 includes a microphone 204 that samples the audio 202 (over time), thereby generating an audio signal. The audio signal can be stored in a memory (buffer) of the mobile computing device 116, and a feature extractor component 206 can extract features from the audio signal. As noted above, the features that can be extracted from the audio signal can include frequencies existent in the audio 202 and respective amplitudes thereof at the position of the mobile computing device 116 in the environment 100.

The audio 202 may be, for example, a piece of music. Such piece of music has frequency and amplitude data corresponding thereto, which can be defined in the audio descriptor 110 and/or identified by the receiver device 104. In an exemplary embodiment, the receiver device 104, when processing the audio descriptor 110 used to generate the audio 202, can identify frequencies and corresponding (ideal) amplitudes in the audio 202, and can transmit such frequencies and amplitudes to the mobile computing device 116. The mobile computing device 116 can retain such data as frequency data 208. In another example, the mobile computing device 116 can transmit features extracted from the audio signal to a cloud service 210, which is configured to identify the musical piece (e.g., the audio 202). The cloud service 210 can then transmit the frequency data 208 to the mobile computing device 116. Such frequency data 208 can be for particular time window in the piece of music, such that the mobile computing device 116 can align the frequency data 208 in time with the frequency data of the audio signal.

The mobile computing device 116 can additionally include a response calculator component 212 that computes a frequency response based upon the frequency data 208 and the frequency data extracted from the audio signal by the feature extractor component 206.

A value determiner component 214 can compute respective values for the filters 112 to be used by the receiver device 104 when processing the audio descriptor 110. As noted above, the receiver device 104 can use the filter values in connection with amplifying or attenuating energy at certain frequencies in the audio 202. In another example, the receiver device 104 can use the filter values in connection with performing dynamic range compression. Other filters are also contemplated. Therefore, as described above, the filters 112 are calibrated as a function of location of the mobile computing device 116 in the environment 100, without the use of a calibration signal.

In another exemplary embodiment, the mobile computing device 116 can further include a speaker 216 that can output audio therefrom. Furthermore, the mobile computing device 116 may include a supplementer component 218 that can drive the speaker 216 to supplement the audio 202 output by the speaker 106 and/or the speaker 108. In an exemplary embodiment, the supplementer component 218 can cause the speaker 216 to supplement the audio 202 based upon filter values computed by the value determiner component 214. For instance, a filter value output by the value determiner component 214 may indicate that the mobile computing device 116 is in a particular "dead" region with respect to a certain frequency band, wherein amplifying energy for the band at the receiver 104 is insufficient to make up for the environmental effects on audio emitted by the speakers 106 and/or 108 in the frequency band. Based upon such information, the supplementer component 218 can cause the speaker 216 to output audio signals corresponding to the audio 202 in the "dead" region e.g., the speaker 216 can output audio in the above-mentioned frequency band).

In another exemplary embodiment, the supplementer component 218 can cause the speaker 216 to output audio that supplements the audio 202 based upon known content of a piece of music or movie. For instance, to immerse the listener 114 in a movie or television program, it may be desirable for the listener 114 to experience sound as it is being experienced by a character in the movie or television program. For example, the mobile computing device 116 may be a tablet computing device, and in a movie being watched by the listener 114, a particular sound can occur in relative close proximity to a character. The supplementer component 218 can cause the speaker 216 to supplement the audio 202 such that, from the perspective of the listener 114, the sound is coming from close proximity to the listener 114 (e.g., rather than from across the room, from the speaker 106 or speaker 108). A plurality of mobile computing devices may include the supplementer component 218, such that audio can be "stitched" together throughout the environment 100, thereby further immersing the listener 114 into a particular aural experience and enhancing design possibilities for audio descriptors.

Figure 3:
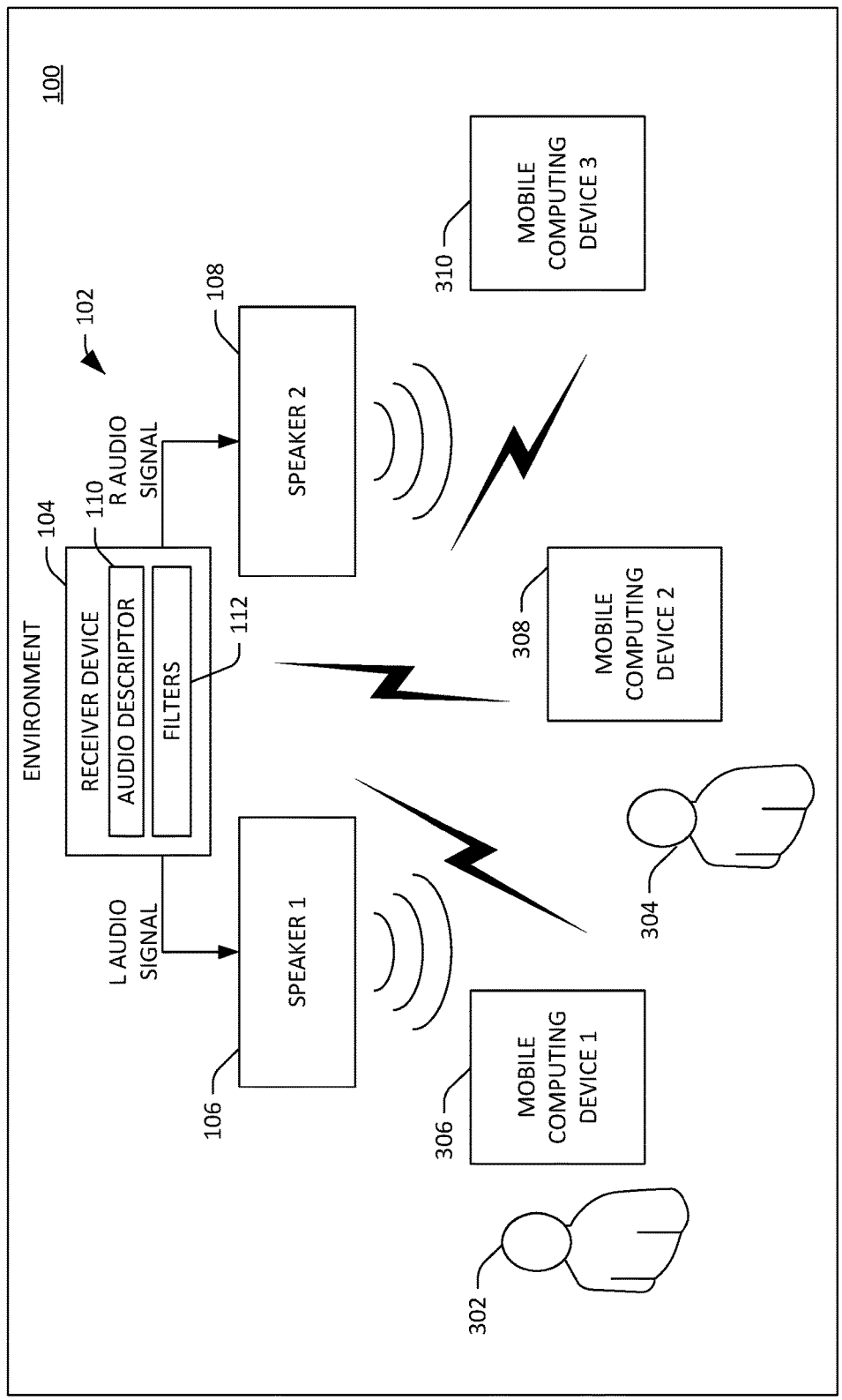
FIG. 3 illustrates an exemplary environment that includes a plurality of mobile computing devices that are employed in connection with calibrating filters utilized by an audio system when outputting audio.

Turning now to FIG. 3, the environment 100 is shown as including two listeners 302 and 304. The listeners 302 and 304 have respective mobile computing devices 306 and 308 being used thereby. For instance, the mobile computing devices 306 and 308 can be mobile telephones of the listener 302 and 304, respectively. In the example shown in FIG. 3, the environment 100 may also include a third mobile computing device 310 that is not in close proximity to either of the listener 302 or 304. For instance, the mobile computing device 310 may be relatively stationary, such as a laptop that typically is placed on an end table.

In the example shown in FIG. 3, it is desirable to calibrate the filters 112 parameters for both of the listeners 302 and 304 as a function of their positions in the environment 100. There are numerous techniques contemplated for performing such calibration. In a first exemplary technique, the speakers 106 and 108 can include respective arrays of beamforming speakers, and the locations of the listeners 302 and 304 in the environment 100 can be ascertained, for instance, through utilization of a suitable sensor device. For example, using image-based sensing, the locations of the listeners 302 and 304 in three-dimensional space can be identified (although other mechanisms for detecting device location are contemplated). The first mobile computing device 306 and the second mobile computing device 308 can act as described above, and can transmit filter values to the receiver device 104. The receiver device 104 may then process the audio descriptor 110, such that left and right drive signals and locations of the listeners 302 and 304 in the environment 100 are provided to the speakers 106 and 108. The first speaker 106 can directionally emit a first audio beam to the location of the first listener 302, and the first speaker 106 can directionally emit a second audio beam to the location of the second listener 304, wherein the first audio beam is based on first filter values (computed by the first mobile computing device 306) and the second audio beam is based on second filter values (computed by the second mobile computing device 308). Similarly, the second speaker 108 can directionally emit a third audio beam to the location of the first listener 302 and the second speaker 106 can directionally emit a fourth audio beam to the location of the second listener 304, wherein the third audio beam is based on the first filter values and the fourth audio beam is based on second filter values. Thus, the filter values are calibrated individually for both the first listener 302 and the second listener 304.

In another exemplary embodiment, the speakers 106 and 108 are not be beamforming speakers. The first mobile computing device 306 and the second mobile computing device 308 can transmit filter values to the receiver device 104, as described above. In an exemplary embodiment, the receiver device 104 can prioritize filter values based upon identities of mobile computing devices that transmitted the filter values to the receiver device 104. For example, the first listener 302 may be an owner of the environment 100 (e.g., a home owner), and the first mobile computing device 306 can be a mobile telephone of the first listener 302. The second listener 304 may be a child of the first listener 302, and the second mobile computing device 308 can be the child's. The homeowner may wish to have priority over the child. Thus, when receiving multiple filter parameter values from multiple mobile computing devices, the receiver device 104 can select filter parameter values received from a mobile computing device with highest priority. In yet another exemplary embodiment, when there is no priority corresponding to filter parameter values provided by the mobile computing devices 306 and 308 (or the priorities are equivalent), the receiver device 104 can be configured to average such values or perform some other smoothing operation to generally calibrate the filter parameters for both listeners 302 and 304.

Further, as indicated above, the third mobile computing device 310 may be relatively stationary, and thus may have a relatively low priority. Therefore, filter values provided by the third mobile computing device 310 may be discarded by the receiver device 104 when receiving filter values from other mobile computing devices in the environment 100. In yet another example, the third mobile computing device 310 can be configured to transmit filter values only when being used. For instance, when mouse activity, keystroke activity, or the like is detected at the third mobile computing device 310, the mobile computing device 310 can be configured to compute filter values, thereby informing the receiver device 104 that a listener is in close proximity to the third mobile computing device 310. Further, as described above, at least one of the mobile computing devices 306-310 can be configured to supplement audio output by the speakers 106 and 108. This can effectively improve the performance of a surround sound audio system.

While mobile computing devices have been described herein as computing the filter values, it is to again be emphasized that such functionality can be performed at the receiver device 104. Additionally, rather than the supplementer component 218 residing on a mobile computing device, the supplemented component 218 may be included in the receiver device 104, which can transmit instructions as to when the speaker 216 is to supplement audio output by speakers in the audio system 102.

Figure 4:
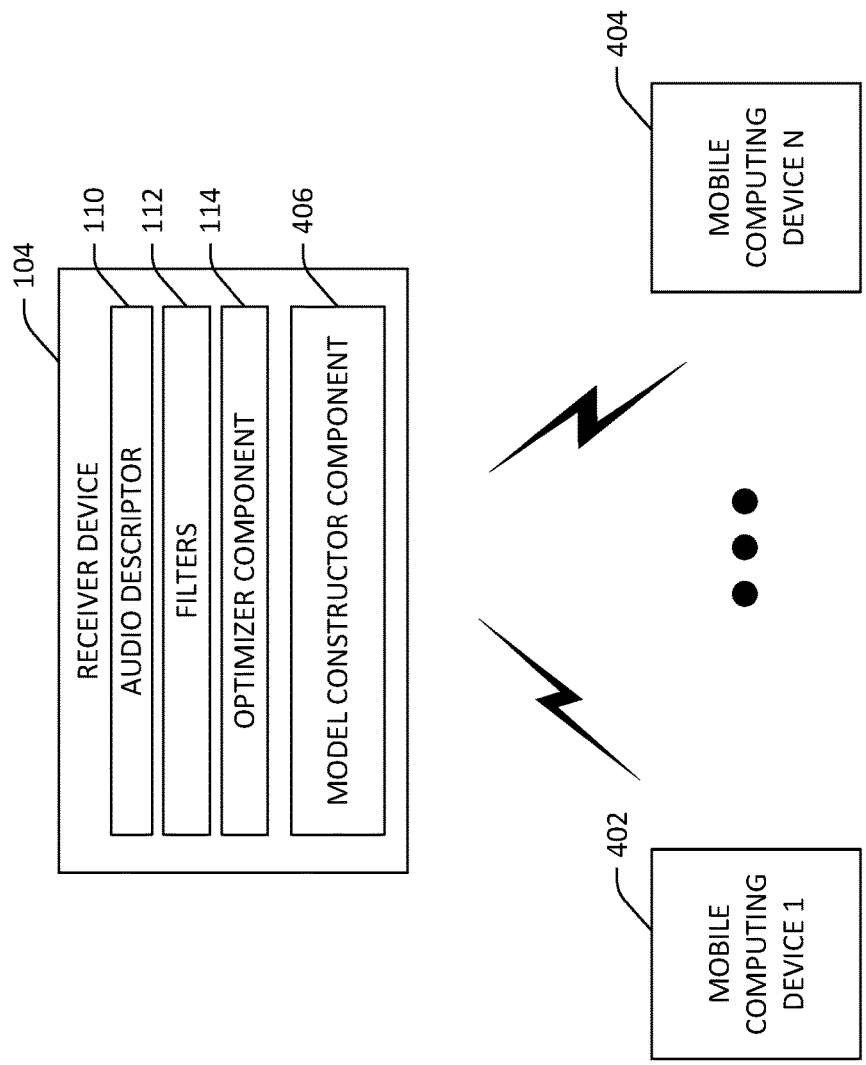
FIG. 4 is a functional block diagram of an exemplary receiver device of an audio system.

With reference now to FIG. 4, a functional block diagram of the receiver device 104 is presented. A plurality of mobile computing devices 402-404 can be in communication with the receiver device 104 over time. Thus, over time, the mobile computing devices 402-404 can provide the receiver device 104 with values for the filters 112 to use when processing the audio descriptor 110. Furthermore, locations of the mobile computing devices 402-404 in the environment 100 can be ascertained and correlated with the filter values provided by the mobile computing devices 402-404.

The receiver device 104 can include an optimizer component 114 that can optimize the filter values based upon filter values provided by the mobile computing devices 402-404 over time. Therefore, audio output by the speakers 106 and 108 can be optimized for a collective of listeners corresponding to the mobile computing devices 402-404, rather than for an individual listener. Further, the receiver device 104 can include a model constructor component 406 that, over time, can construct an acoustic model of the environment 100, which may then be employed even when there are no mobile computing devices 402-404 in the environment 100, or when such mobile computing devices are not in close proximity to listeners. That is, as listeners move about the room, frequency responses of the audio system 102 pertaining to music with a variety of frequencies associated therewith can be computed, such that the model constructor component 406 can learn how the environment 100 affects audio emitted therein. Accordingly, the model constructor component 406 can ascertain that when a listener is located in a first location in the environment, frequencies in a particular frequency band are desirably amplified, while when the user is in a second location in the environment 100, frequencies in the frequency band are desirably attenuated. Hence, over time, when the locations of listeners in the environment 100 can be ascertained, the model constructor component 406 can generate an acoustic model that can be utilized by the receiver device 104 to assign filter values to the filters 112, such that the filters 112 are calibrated based upon locations of listeners in the environment regardless of whether their mobile computing devices are active.

Figure 5:
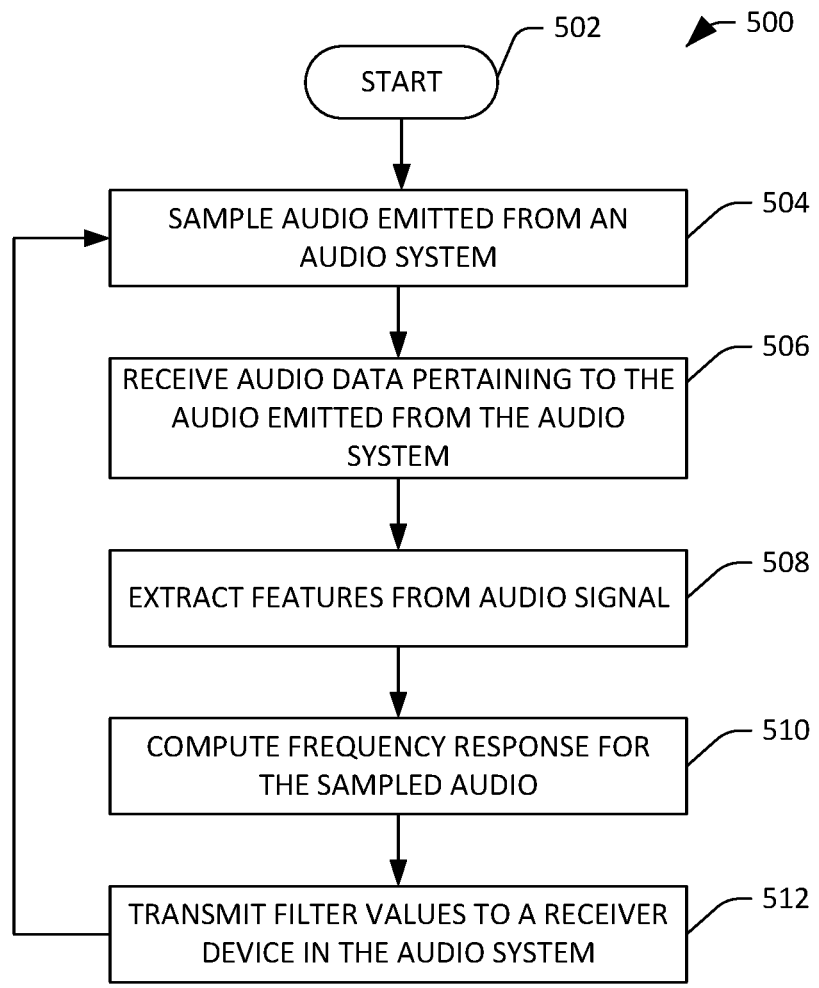
FIG. 5 is a flow diagram that illustrates an exemplary methodology that can be executed by a mobile computing device in connection with calibrating filters used by an audio system when outputting audio.
Figure 6:
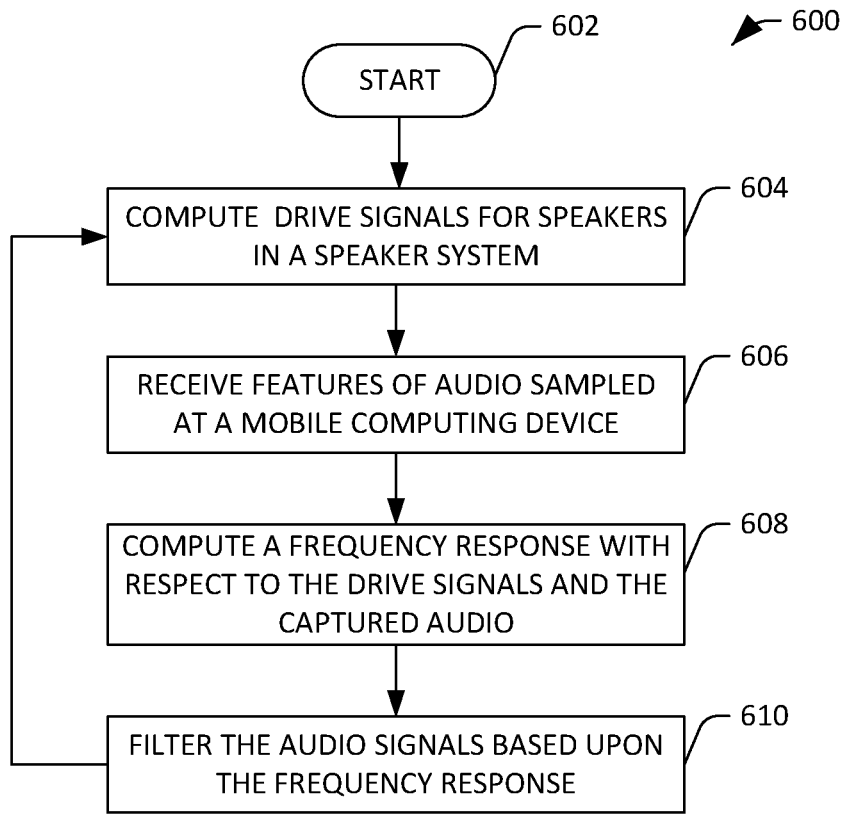
FIG. 6 is a flow diagram that illustrates an exemplary methodology that can be executed by a receiver device of an audio system in connection with calibrating filters used by the audio system when outputting audio.

FIGS. 5-6 illustrate exemplary methodologies relating to calibrating filter parameter values of an audio system. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

With reference now to FIG. 5, an exemplary methodology 500 that facilitates calibrating filters used in an audio system through utilization of a mobile computing device of a user is illustrated. The methodology 500 starts at 502, and at 504, audio emitted from at least one speaker in an audio system is sampled (e.g., by a microphone), resulting in the generation of an audio signal. At 506, audio data pertaining to the audio emitted from the speaker is received. This audio data can include frequencies in the audio over a particular time range and amplitudes of such frequencies.

At 508, features are extracted from the audio signal. Such features can include frequencies in the sampled audio and respective amplitudes thereof. At 510, a frequency response for the audio system is computed based upon the audio signal and the audio data, wherein the frequency response is indicative of impacts of the environment on the sampled audio at the mobile computing device. Values for filters (e.g., equalization filters) can be computed based upon the frequency response. In an exemplary embodiment, a value for a filter can be computed by identifying amplitudes of respective frequencies in a frequency band corresponding to the filter, and computing a summation of the amplitudes or an average of the amplitudes, wherein the resultant value is assigned to the frequency band. This value can then be compared with the corresponding (ideal) value for the frequency band, and the filter value can be computed based upon a difference between the computed value and the ideal value.

At 512, the filter values are transmitted to a receiver device in the audio system, such that the receiver device can use the filter values to filter audio output by the speakers to optimize the audio for the location of the mobile computing device in the environment. The methodology 500 can return to 504, where the acts 504-510 can be repeated, such that, for example, the filter values are dynamically calculated and updated.

With reference now to FIG. 6, another exemplary methodology 600 that can be executed by a receiver device in an audio system is illustrated. The methodology 600 starts at 602, and at 604, drive signals to be transmitted to respective speakers in a speaker system are computed, wherein the drive signals can be computed by processing an audio descriptor. At 606, features of audio sampled at a mobile computing device are received from the mobile computing device. At 608, a frequency response is computed with respect to the drive signals computed at 604 and the features received at 606. At 610, the drive signals are filtered based upon the frequency response computed at 608, and the drive signals are transmitted to respective speakers. The methodology 600 can then repeat, such that the filters used to filter the drive signals are dynamically calibrated.

Figure 7:
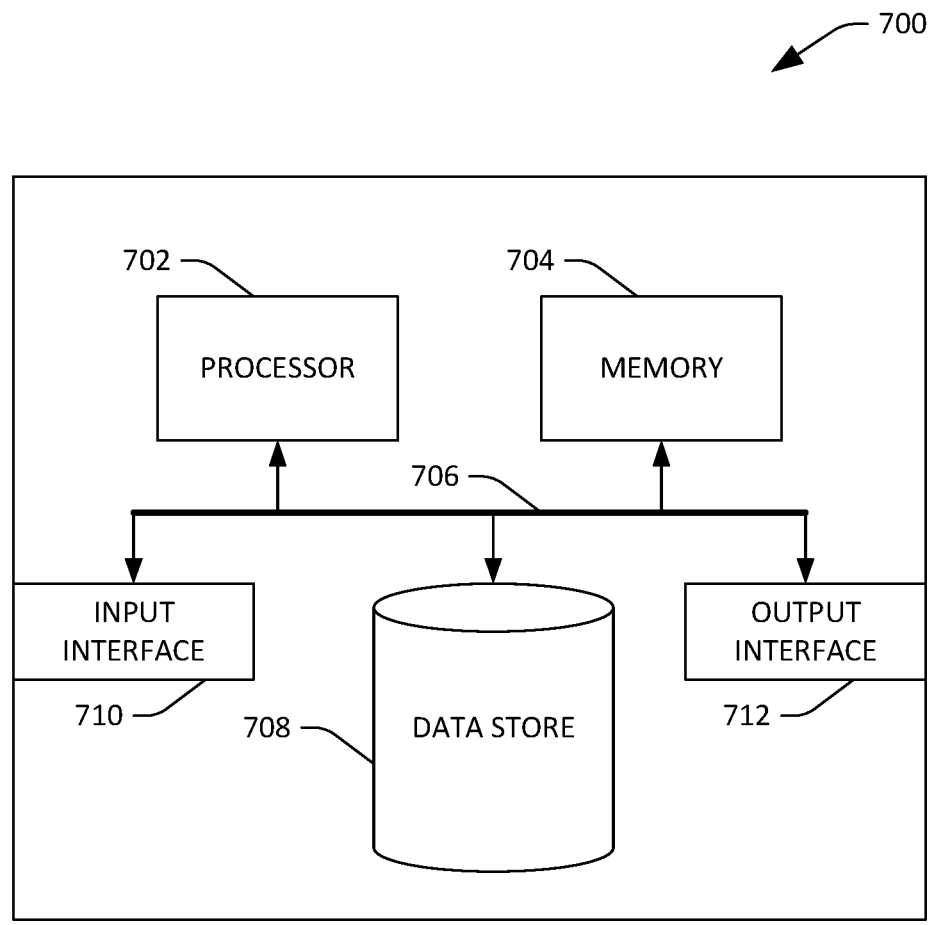
FIG. 7 is an exemplary computing system.

Referring now to FIG. 7, a high-level illustration of an exemplary computing device 700 that can be used in accordance with the systems and methodologies disclosed herein is illustrated. For instance, the computing device 700 may be used in a system that facilitates dynamic calibration of filter parameters. By way of another example, the computing device 700 can be used in a system that outputs audio using dynamically calibrated filter parameters. The computing device 700 includes at least one processor 702 that executes instructions that are stored in a memory 704. The instructions may be, for instance, instructions for implementing functionality described as being carried out by one or more components discussed above or instructions for implementing one or more of the methods described above. The processor 702 may access the memory 704 by way of a system bus 706. In addition to storing executable instructions, the memory 704 may also store an audio file, filter parameter values, etc.

The computing device 700 additionally includes a data store 708 that is accessible by the processor 702 by way of the system bus 706. The data store 708 may include executable instructions, an audio file, filter parameter values, etc. The computing device 700 also includes an input interface 710 that allows external devices to communicate with the computing device 700. For instance, the input interface 710 may be used to receive instructions from an external computer device, from a user, etc. The computing device 700 also includes an output interface 712 that interfaces the computing device 700 with one or more external devices. For example, the computing device 700 may display text, images, etc. by way of the output interface 712.

It is contemplated that the external devices that communicate with the computing device 700 via the input interface 710 and the output interface 712 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 700 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of compute readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A mobile computing device comprising:
   a microphone;
   at least one processor; and
   memory that stores instructions that, when executed by the at least one processor, cause the at least one processor to perform acts comprising:
      computing a value for a filter as a location of the mobile computing device alters in an environment relative to an audio system, wherein the value for the filter is computed based upon music emitted from the audio system and captured by the microphone of the mobile computing device; and causing data to be transmitted to the audio system, wherein the data comprises the value of the filter, and further wherein the audio system, responsive to receipt of the data, is configured to employ the value for the filter when emitting the music.

2. The mobile computing device of claim 1, wherein computing the value for the filter as the location of the mobile computing device alters in the environment comprises updating the value for the filter as the location of the mobile computing device alters in the environment.

3. The mobile computing device of claim 1 being a smart phone.

4. The mobile computing device of claim 1 being a wearable device.

5. The mobile computing device of claim 1, wherein computing the value for the filter comprises:

extracting features from the music captured by the microphone; and computing the value for the filter based upon the features extracted from the music captured by the microphone.

6. The mobile computing device of claim 5, wherein the features extracted from the music are indicative of amplitudes of frequencies in the music as captured by the microphone, and further wherein computing the value for the filter further comprises:

comparing the features extracted from the music with ideal amplitudes of the frequencies in the music; and computing the value for the filter based upon the comparing of the features extracted from the music with the ideal amplitudes of the frequencies in the music.

7. The mobile computing device of claim 6, wherein computing the value for the filter further comprises:

identifying the music; and responsive to identifying the music, acquiring the ideal amplitudes of the frequencies in the music.

8. The mobile computing device of claim 1, the filter being an equalization filter.

9. The mobile computing device of claim 1, the acts further comprising:

outputting audio from a speaker of the mobile computing device based upon the value of the filter, the audio supplements the music emitted by the audio system.

10. The mobile computing device of claim 1, the acts further comprising:

receiving, from a receiver of the audio system, data that is indicative of ideal amplitudes of the music; and computing the value for the filter based upon the data that is indicative of the ideal amplitudes of the music.

11. The mobile computing device of claim 1, the acts further comprising:

determining a location of the mobile computing device relative to a location of a speaker of the audio system; and computing the value for the filter based upon the location of the mobile computing relative to the location of the speaker, wherein the value for the filter is computed to cause the speaker to output spatialized audio.

12. A method executed by a mobile computing device, the method comprising:

capturing, by way of a microphone of the mobile computing device, music output by an audio system, wherein the music is captured over time as the mobile computing device is moved in an environment relative to the audio system;

computing a value for a filter based upon the captured music, wherein the value for the filter is computed as the mobile computing device is moved in the environment; and transmitting the value for the filter to the audio system, wherein the audio system, responsive to receiving the value for the filter, is configured to emit the music using the value for the filter.

13. The method of claim 12, wherein the value for the filter, when employed by the audio system to emit the music, causes the music to have frequencies with ideal amplitudes when captured by the mobile computing device.

14. The method of claim 12, wherein the filter is an equalization filter.

15. The method of claim 12, wherein computing the value for the filter comprises:

extracting features from the captured music; and computing the value for the filter based upon the features extracted from the music.

16. The method of claim 15, wherein the features extracted from the music are indicative of amplitudes of frequencies in the captured music, and further wherein computing the value for the filter further comprises:

comparing the features extracted from the music with ideal amplitudes of frequencies in the music; and computing the value for the filter based upon at least one difference between the features extracted from the music and the ideal amplitudes of the frequencies in the music.

17. The method of claim 16, wherein computing the value for the filter further comprises:

transmitting the features extracted from the music to a computing device that is in network communication with the mobile computing device; and obtaining the ideal amplitudes of the frequencies in the music from the computing device responsive to transmitting the features extracted from the music to the computing device.

18. The method of claim 12, further comprising:

setting a value for a second filter based upon the computed value for the filter; and transmitting the value for the second filter to the audio system, wherein the audio system, responsive to receiving the value for the second filter, is configured to emit the music using the value for the second filter.

19. A computer-readable storage medium of a mobile computing device, the computer-readable storage medium comprising instructions that, when executed by a processor, cause the processor to perform acts comprising:

computing a value for a filter for an audio system dynamically as music is captured by a microphone of the mobile computing device and as the mobile computing device is moved about in a room relative to the audio system; and transmitting the value for the filter to the audio system responsive to computing the value for the filter, wherein the audio system, responsive to receiving the value for the filter, is configured to emit the music using the value for the filter.

20. The computer-readable storage medium of claim 19, wherein the mobile computing device is a mobile telephone.

* * * * *